United States Patent Office 3,600,364
Patented Aug. 17, 1971

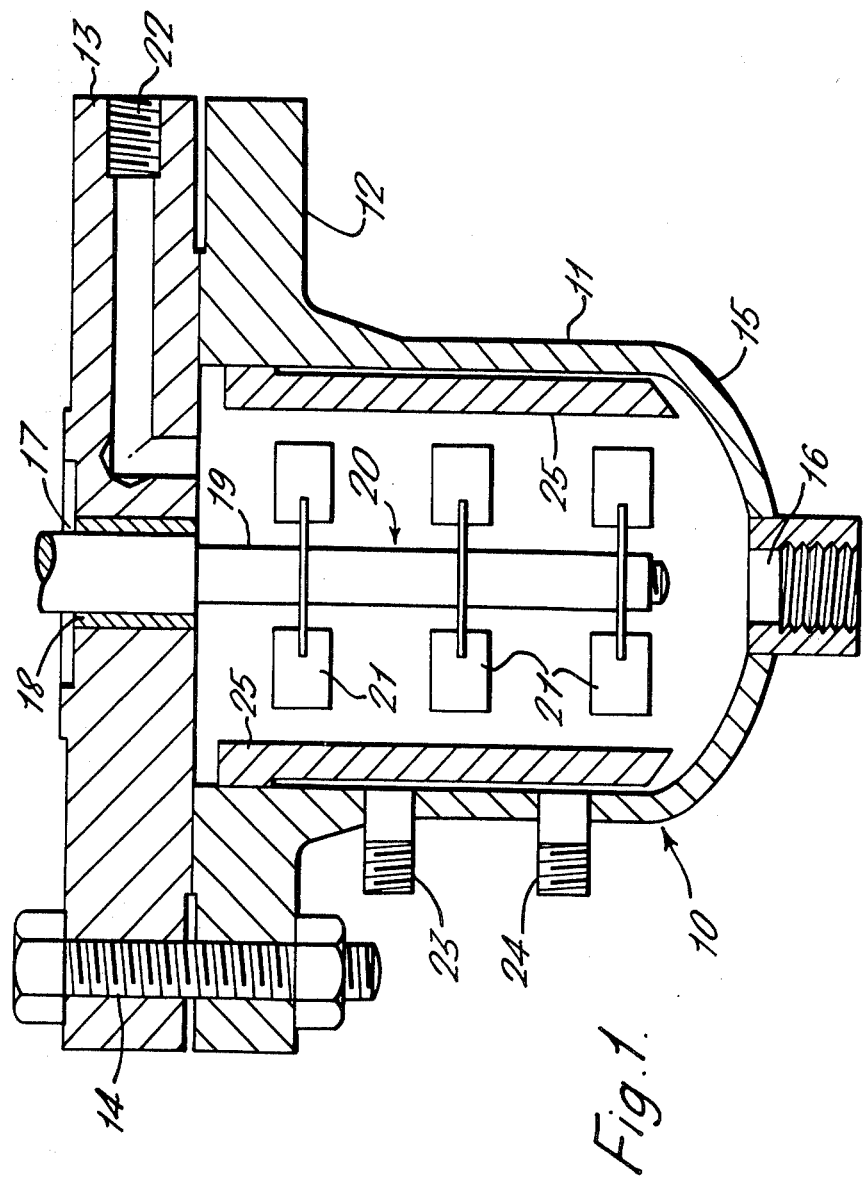

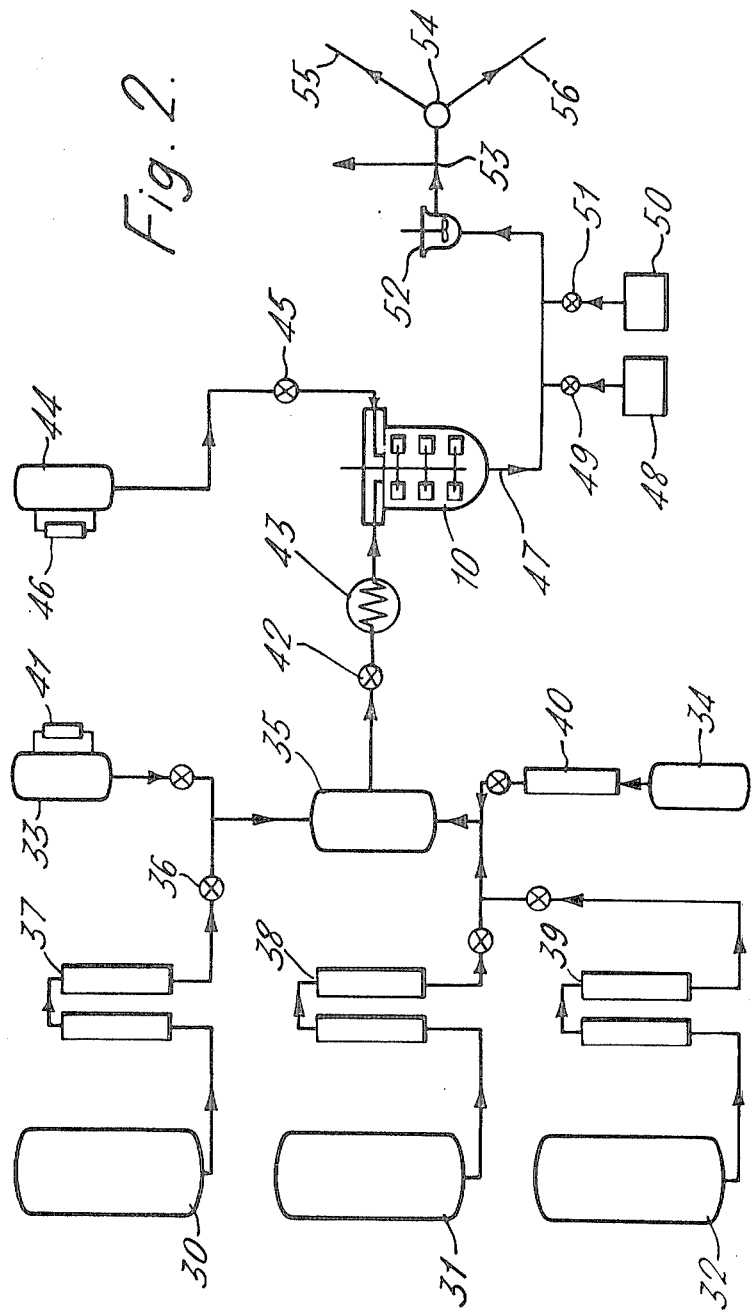

3,600,364
PROCESS OF PREPARING ETHYLENE COPOLYMERS
Haider Beg Mirza and Semih Zaim, Sarnia, Ontario, Canada, assignors to Polymer Corporation, Sarnia, Ontario, Canada
Filed Oct. 19, 1967, Ser. No. 676,523
Claims priority, application Canada, Oct. 24, 1966, 973,877
Int. Cl. C08f *15/40*
U.S. Cl. 260—80.78       6 Claims

ABSTRACT OF THE DISCLOSURE

Rubbery amorphous copolymers of ethylene and at least one other olefin are prepared in a continuous system by feeding the reactant in liquid feed streams to a rapidly agitated reactor, the residence time in the reactor being from six seconds to six minutes and the reaction temperature being maintained by pre-cooling of the feed prior to entry into the reactor.

---

This invention relates to a continuous process for preparing amorphous copolymers of ethylene with other copolymerizable monomers.

More specifically, it relates to a process of preparing amorphous copolymers of ethylene and propylene, perhaps with other copolymerizable monomers such as diolefins, e.g. 1,4-hexadiene, dicyclopentadiene, norbornadiene derivatives and the like, and will be particularly described with relation to such copolymers. However, the process is not limited to such copolymer production.

Amorphous copolymers of ethylene and propylene are well known, and are of particular interest because they exhibit rubber-like elasticity at room temperature or below. The monomers are cheap and readily available, and the amorphous copolymers, being completely saturated, having ageing properties which are superior to those of other rubbers which contain unsaturation. They are generally prepared by copolymerization at relatively low temperatures and pressures using so-called Ziegler catalysts.

The elastic properties of the copolymers are impaired if they are not homogeneous and show a tendency to crystallize. Ethylene-propylene copolymers with good rubbery properties must have the minimum number of units derived from one monomer adjacent to each other, i.e. a high degree of randomness, if they are not to show crystallinity. For example, copolymers in which there are ten or more contiguous ethylene units exhibit sufficient crystallinity to detract from their elastic properties at room temperature.

It is particularly difficult in practice to design a process which will run continuously for long periods of time at an economic rate and produce good rubbery, amorphous copolymers of ethylene and propylene which do not contain large numbers of contiguous units derived from one monomer. The main reason for this is that ethylene and propylene have widely different reactivities. At room temperature ethylene is at least 50 times more reactive than propylene. Whilst continuous processes have been developed, the necessary control over the process conditions to produce good rubbery polymers has proved difficult and expensive to exercise.

Whilst amorphous ethylene-propylene copolymers themselves have found a number of important practical applications, for many conventional rubber uses it is desirable that the rubber should contain some residual unsaturation, enabling it to be vulcanized by conventional rubber vulcanizing processes. For this reason, it is common to prepare amorphous terpolymer rubbers of ethylene, propylene and a small amount of a diolefinic third monomer. The polymer can then be vulcanized in conventional rubber vulcanizing processes, e.g. using sulphur. Such third monomers are generally used in amounts of up to five mole percent based on the total polymer. Suitable third monomers include 1,4-hexadiene, dicyclopentadiene, norbornadiene, methylene norbornene, ethylidene norbornene, other alkenyl norbornenes, cyclo-octadiene and tetrahydroindene. It will therefore be understood that the term "amorphous ethylene copolymer" as used herein includes multipolymers containing units derived from one or more such monomers within its scope. The inclusion of a third monomer in the polymerization recipe however puts further demands on the polymerization process. Not only must the units derived from ethylene and propylene be arranged so that the polymer contains a distribution of units which precludes crystallinity in the polymer, as previously outlined, but also the vulcanization sites, i.e. the units derived from third monomers, should be evenly distributed both along the polymer chain and between polymer chains so that the vulcanizates of the terpolymers exhibit optimum physical properties.

There is yet another problem in the production of ethylene-propylene terpolymers which must be overcome, and this is the tendency of the monomers to form a gelled product. This gel is generally either crystalline or cross-linked material. It is believed that this gel formation is associated with chemical cross-linking caused by the third monomer during polymerization. When gel forms, it may either be deposited inside the reaction vessel or it may remain combined with the desired product. In the first case, the gel will build up inside the reaction vessel and eventually necessitate a shut-down of the reactor whilst it is removed. This is particularly serious in terms of production loss where the process is carried out continuously. In the second case, it imparts undesirable characteristics to the product.

It is therefore an object of the present invention to provide a continuous process for preparing substantially amorphous copolymers of ethylene which are suitable for use as rubbers, at an attractive economic rate.

A further object is to provide a continuous process for preparing substantially gel-free, amorphous copolymers of ethylene, of satisfactory homogeneity.

The inventors have discovered that satisfactory amorphous ethylene copolymers may be produced by continuous copolymerization of the monomers using very short residence times and very high degrees of agitation, and keeping the reaction temperature constant by pre-cooling at least some of the reactants to the degree necessary to allow for the exothermic nature of the process.

Reference is now made to the accompanying drawings, in which:

FIG. 1 is a cross-sectional view of a vertical plane of a suitable reactor for carrying out the process of the invention;

FIG. 2 is a diagrammatic flow sheet of a process in accordance with the invention.

Referring firstly to FIG. 1, the reactor 10 comprises a substantially cylindrical vessel with vertical side walls 11, made of stainless steel. An outwardly extending peripheral annular flange 12 is provided at the upper extremity of the side walls 11 of the reactor. The reactor is closed at its upper end by means of a removable cover plate 13 which is bolted at various circumferential positions such as 14 to the flange 12, of the reactor.

The reactor is closed at its lower end by a shallow part-spherical end wall 15 formed integrally with the side walls 11. An orifice 16 is provided in the center of this lower end wall 15, which serves as the product stream outlet from the reactor, and to which a pipe may be connected.

The cover plate 13 is apertured at its center, and the aperture 17 is provided with a sleeve 18 of anti-friction material such as Teflon. The central shaft 19 of the impeller 20 passes through this aperture, and forms a liquid-tight seal with the sleeve 18. The impeller shaft 19 is drivingly connected exteriorly of the reactor 10 to a driving motor, and three vertically spaced sets of six turbine blades 21 fixedly attached to the shaft 17 within the reactor. Baffles 25 are secured to the inside of the side walls at circumferentially spaced positions, to facilitate mixing.

The cover plate 13 is provided with circumferentially spaced inlet apertures such as 22 through which the feed streams enter the reactor 10. These inlet apertures 22 are disposed adjacent to each other and also adjacent to the center of the reactor, so that they are vertically above the path of the impeller blades 21. Such an arrangement ensures that the feed streams are mixed together rapidly after they enter the reactor, by means of the impeller blades.

The side walls 11 of the reactor 10 are also apertured at 23 and 24 for insertion of thermometers by means of which the reaction temperature is determined.

The overall size of the reactor may vary over considerable limits, but it will be appreciated that the volume of the reactor is one factor involved in the determination of the residence time of the process. If a large volume reactor is to be used, the rate of feed of reactants to the reactor must be correspondingly large to maintain the same residence time. Thus if the degree of conversion is to be kept constant, the rate of polymer production will be increased with the feed rate. It will be further appreciated that, as the polymerization process is exothermic, the amount of heat generated will be greater, the greater the rate of polymer production. This may lead to difficulties in the provision of suitable cooling means. However, one advantage of the process of the invention is that large reactors are not necessary for an economic production rate.

After issuing continuously from the reactor, the product stream, which contains dissolved product, unreacted monomers and catalyst, is continuously treated to deactivate the catalyst and the product is recovered from solution. When small amounts of product are to be recovered, e.g. in the present continuous process periodically for testing purposes to enable any necessary corrections to be made to the process conditions to obtain on-specification product, the most convenient method is to add to the product stream an excess of ethyl alcohol, which both deactivates the catalyst and precipitates the product. The product may then be isolated, treated and tested. Large amounts of product, i.e. the bulk of the product from the continuous process, are best recovered by steam stripping. In this method, the product stream is continuously injected as it leaves the reactor with an amount of ethyl alcohol just sufficient to deactivate the catalyst. A little antioxidant solution is also added at this stage, to stabilize the product stream. Acetic acid is then added to the product stream, which serves to render the catalyst residue water soluble. The product stream is washed with water, by which means the catalyst residues are dissolved in the aqueous phase and removed from the organic phase containing dissolved product. The organic phase is then subjected to a mixture of water and steam, which causes the solvent to evaporate off, and the polymer is deposited as crumb. The product is then dried and formed into pellets.

Referring now to FIG. 2, a suitable flow sheet for the process is indicated therein. Large capacity storage means 30, 31 and 32 contain respectively the solvent hexane, ethylene and propylene. The smaller storage tanks 33 and 34 contain respectively a standard solution of vanadium oxytrichloride in hexane, and the third monomer, dicyclopentadiene.

These reactants are fed to a mixed feed tank 35, the quantities being metered by means of flow valves such as 36 provided in each feed line. The solvent, ethylene, propylene and dicyclopentadiene are fed via respective drying columns 37, 38, 39 and 40. The level of vanadium catalyst solution in tank 33 is measured by means of glass measuring column 41 attached to the tank 33.

After thorough mixing of these reactants in the mixed feed tank, the mixed feed is fed via metering flow valve 42 and cooling vessel 43 to the reactor 10. In the reactor, the mixed feed stream comes into contact with the other catalyst component, the aluminum alkyl compound in solution in hexane, which is fed to the reactor 10 from storage tank 44 via metering flow valve 45. Storage tank 44 is provided with a measuring column 46, in a similar manner to tank 33.

The liquid product stream 47 issues from the bottom of the reactor 10. It is then mixed with ethyl alcohol, to deactivate the catalyst. The alcohol is fed from storage means 48 via metering flow valve 49, an amount of alcohol just sufficient to deactivate the catalyst being added, so that the product remains in solution. In order to protect the product against degradation, the product stream is then treated with an antioxidant. The antioxidant is stored in storage means 50 and fed therefrom via metering flow valve 51 to the product stream.

The product stream then passes to an in-line mixer 52, where thorough mixing of the product stream, catalyst deactivator and anti-oxidant is completed. Samples of the product stream for testing, to check whether the product is of the desired specification and to allow any adjustments of the process conditions to be made, are withdrawn at point 53 downstream of the in-line mixer 52. Depending on the results obtained by this sampling, the product stream is directed via valve 54 either to the on-specification storage means via line 55 or to the off-specification storage means via line 56.

Preferably, the catalyst used in the process of the invention comprises a vanadium compound, mixed with an alkyl aluminum compound selected from the group comprising monoalkyl aluminum dichloride, dialkyl aluminum monochloride, and alkyl aluminum sesquichloride, the alkyl radical in each case having from one to twelve carbon atoms. Suitable vanadium compounds include vanadium oxytrichloride, vanadium tetrachloride, vanadates and vanadium tri-(acetonyl-acetonate). Ethyl aluminum compounds are the preferred alkyl aluminum compounds.

The polymerization process is carried out in the liquid phase and preferably in the presence of a suitable inert solvent such as hexane. The catalyst components are normally soluble in the solvent. Thus, the reaction components may all be dissolved in the solvent and fed continuously to the reaction zone in one or more liquid feed streams. The reaction zone is preferably completely filled with liquid, substantially no gaseous phase being present. Further, to ensure that all the reactants remain dissolved in the solvent and hence that the reaction takes place in the liquid phase, the pressure within the reaction zone is slightly above atmospheric pressure. Copolymerization takes place in the liquid phase, and a liquid stream containing dissolved product, unreacted monomers and catalyst residue is continuously withdrawn from the reaction zone. The rate of feed of liquid to the reaction zone is constant and equal to the rate of withdrawl of liquid from the reaction zone, so that the continuous polymerization takes place under steady state conditions.

It is most convenient to feed the reaction components to the reaction zone in two separate liquid feed streams. One feed stream preferably contains all the monomers and one catalyst component, dissolved in the solvent. The other feed stream contains the other catalyst component dissolved in more solvent. These feed streams are mixed together within the reaction zone. This ensures that the copolymerization reaction does not commence before the reaction components enter the reaction zone, and eliminates risk of plugging the inlet pipes, etc. with polymer.

The copolymerization of ethylene with other monomers is exothermic. However, for the formation of substantially amorphous homogeneous ethylene-propylene copolymers or terpolymers, it is desirable that the reaction temperature should be kept below about 100° C., and preferably within the range of from about 30° C. to about 60° C. An essential feature of the continuous process of the invention is that the reaction temperature is maintained substantially at a predetermined value below about 100° C. by cooling the or each liquid feed stream to the required extent before it enters the reaction zone. Thus the heat generated by the reaction is used to warm the reactants to the reaction temperature and the extent to which the reactants are cooled is determined by the desired reaction temperature. A substantially constant reaction temperature is thereby maintained, when the copolymerization process reaches steady state conditions.

The actual effect which this method of regulating the reaction temperature has is not at this time fully understood. When using the very short residence times of the present invention it has been found essential for the formation of a homogeneous product that this system of pre-cooling should be used. It is believed that the elimination of heat transfer surfaces, from contact with the reaction mixture, is necessary for the formation of a homogeneous, gel-free product at the very short residence times of the invention. An added advantage is that the pre-cooling system simplifies the apparatus needed for carrying out the continuous process, by reducing or eliminating the need for the reactor to present heat transfer surfaces to the reaction mixture.

The continuous copolymerization reaction of the present invention may thus be considered as being carried out semi-adiabatically. Practically no heat is led into or out of the reaction zone itself during the reaction, except that supplied by agitation of the reaction mixture. The reaction mixture is not subjected to any cooling by contact with cooled surfaces. The reactor vessel itself will inevitably conduct away a small amount of heat from the reaction mixture by contact therewith, but the vessel itself is not artificially cooled.

When, as is most convenient, the reaction components are fed to the reactor in two separate liquid feed streams, one or both of the feed streams may be cooled. The extent to which the or each feed stream is pre-cooled is determined by the desired reaction temperature and the degree of conversion. As the residence time according to the present invention is not more than six minutes, the temperature to which the feed stream or streams are cooled may be as low as $-100°$ C. for a reaction temperature within the range 50 to 60° C. The magnitude of the difference between the temperature of the feed stream and the reaction temperature is dependent on a number of factors. Obviously, it will depend on whether some or all of the reactants are being pre-cooled. It will also depend upon the degree of conversion, the monomer concentration in the feed, and the heat input of the agitator. The cooling is effected by any suitable cooling means such as contacting the feed stream or streams with coils through which a liquid refrigerant is continuously circulated.

A further requirement of the process of the invention is that the reaction components should be subjected within the reaction zone to a high degree of agitation. This is best expressed in terms of the "terminal mixing time" of the system. The terminal mixing time may be defined as the time from the start of the mixing to the time when the sample achieves uniformity of composition, which is not further changed by additional mixing. It should be noted that this is something less than absolutely complete mixing, which implies homogeneity even to the molecular level.

The terminal mixing time of the system is a function of a number of characteristics of the particular reactor/liquid system being used. For a one phase liquid system having an impeller type agitator, the terminal mixing time has been shown empirically to be related to the diameter of the reactor, the depth of liquid in the reactor, the diameter and rotational speed of the impeller, the viscosity and mass density of the liquid and the gravitational acceleration constant (g). When the impeller type agitator is replaced by liquid mixing jets, the diameter and rotational speed of the impeller are replaced by the diameter and velocity of the mixing jets. In effect, it is related to the reactor geometry, the speed of mixing, and the fluid properties. These last two items make up the Reynolds number of the system.

The terminal mixing time of a given reactor system may be determined experimentally by means of the following procedure. The reactor is largely filled with a liquid containing an acid-base indicator, such as phenolphthalein. A twice normal solution of sodium hydroxide is added until the red color of the phenolphthalein is developed. Twice normal hydrochloric acid is then added slowly, whilst mixing the solution, until the solution just becomes colorless and equilibrium is achieved. A measured quantity of the sodium hydroxide solution is then added and the liquid in the reactor is mixed, so as to develop the red colour of the indicator and to attain equilibrium in the solution.

Then the measured quantity of hydrochloric acid required to neutralize the excess sodium hydroxide in the solution is added. Mixing is started at the instant the acid is added. The time required for the very last trace of red colour to disappear after addition of the acid is measured, and this is the terminal mixing time of the system. If the system is in practice to be used on liquids of different densities and viscosities from these test solutions, then suitable inert miscible liquid additives may be incorporated in the test solutions to simulate these densities and viscosities.

In carrying out the continuous process according to the present invention, it may be desirable to carry out an experiment such as that described above, in order to determine the terminal mixing time of the system which is to be used. It is necessary, to be sure of success in the process, that the terminal mixing time of the system is not more than one-quarter of the residence time.

As an alternative to determining the terminal mixing time by such an experiment, a quantitative relationship of terminal mixing time and reactor characteristics, for the case where the reactor contains a turbine type impeller, has been reported by K. W. Norwood and A. B. Metzner in an article entitled "Flow Patterns and Mixing Rates in Agitated Vessels," in the A.I.Ch.E. Journal, Volume 6, No. 3, page 432 (September 1960).

Failure to operate under the necessary high degree of agitation, i.e. in a system in which the terminal mixing time is more than one-half the residence time, has an adverse effect on the homogeneity of the product. Copolymers of wide distribution of molecular weight, in some cases containing detrimental amounts of crystallinity, are likely to be formed. In extreme cases of insufficient agitation, insoluble gel is formed which plugs the continuous reactor, requiring shut-down for cleaning purposes.

The residence time is a measure of the average time in the reactor of all the components, and is determined by dividing the volume of the reaction mixture by the rate at which feed enters the reaction mixture. Strictly speaking, the volume of the reaction mixture is not identical with the volume of reaction mixture inside the reactor, as it will be realized that the volume of the reaction mixture is that between the point where reaction commences and the point where the reaction ceases. This latter point is effectively the point where the catalyst is continuously deactivated, and this is normally located immediately downstream of the reactor itself.

The process according to the invention should be considered as a whole, as involving three essential features, namely short residence time, pre-cooling of the feed and high agitation. It will be appreciated that the use of very short residence times according to the present invention enables the rate of production of copolymers to be increased, or alternatively allows the use of much smaller reactors for an economic production rate, as compared with known continuous processes. The use of such smaller reactors enables easier scaling up of the process from experimental size to commercial production size. The useful residence times according to this invention are six minutes or less. The lower limit is determined by the equipment limitations rather than the chemistry of the process, and is geenrally of the order of six seconds. As will be seen hereinafter, residence times of less than thirty seconds have been successfully used in the process.

The relative proportions of the various monomers in the feed to the reaction zone are determined by the desired composition of the product. To produce amorphous copolymers of ethylene and propylene, it is necessary that the proportion of ethylene in the product is less than about 78 mole percent, otherwise crystallinity in the product appears to be unavoidable. It is however desirable to incorporate into the polymer the maximum amount of ethylene consistent with obtaining good rubbery properties. This is because polyethylene is more stable than polypropylene and so ethylene-propylene copolymers with higher amounts of ethylene show better ageing properties. Also, such copolymers have better low temperature properties. Thus it is usual to produce copolymers having from about 40 to 78 mole percent of bound ethylene, and those containing from 60 to about 76 mole percent bound ethylene are especially preferred. It is however indicative of the high degree of homogeneity of the products of this process, that products of bound ethylene content up to 78 mole percent can be produced which show no evidence of crystallinity. When a third monomer is to be introduced in the polymer to provide residual unsaturation, as previously outlined, the third monomer is usually present in amounts of from 0.5 to 3 mole percent of the polymer.

Owing to the wide variation of reactivities between ethylene and propylene, the composition of the feed will not be the same as the composition of the product. At the start of the continuous process of the invention, the product is analyzed for the relative proportions of monomers incorporated therein, and any corrections necessary are made to the feed stream so as to produce the desired product. Provided other conditions, such as the type and amount of the catalyst, the reaction temperature, and the residence time, are kept constant, the composition of the product can be varied by variation of the feed composition. A further operating advantage of working at short residence time will now be apparent. As products are produced rapidly after the start up of the reactor, they can be analyzed and any necessary adjustments can be made to the feed composition, and other process conditions, very quickly after start up. Thus the time before on-specification product is produced, and the amount of off-specification product is only small. Once the necessary corrections have been made to the feed composition, the process will rapidly achieve steady state conditions, and the process will produce continuously for long periods of time a product of the desired composition.

The reaction of the process of the invention is preferably carried to an overall conversion of at least 30%, and preferably between 60 and 80%. This again can be regulated, by varying the catalyst components, the concentration of monomers in feed streams and the ratio of the various catalyst components. When using a catalyst of vanadium oxytrichloride and an aluminum ethyl chloride, the molar ratio of aluminum to vanadium is preferably from 6/1 to 12/1, for the preferred conversion levels. It is less economically desirable to work at lower conversion levels, whereas at higher conversion there is a risk of forming gelled products. Also at very high conversion levels, one tends to have less unreacted propylene in the reactor, due to the different reactivities of ethylene and propylene, and consequently the randomness of the product suffers.

The molecular weight of the products may also be arranged by adjustment of the process conditions. The molecular weight of a rubber is believed to be the predominant factor in controlling the Mooney viscosity of the rubber, which is a measure of its consistency. It is therefore more convenient to discuss the Mooney viscosity of the products than their molecular weight. In the present invention the Mooney viscosity of the product is determined predominantly by the proportion of catalyst and monomers in the feed and secondarily by the reaction temperature. An increase in the catalyst proportion seems to lead to a rubber of decreased Mooney viscosity. Higher Mooney viscosity products tend to be produced at lower reaction temperatures.

Other factors which apparently affect the Mooney viscosity are the composition of the feed, and also the molar ratio of aluminum to vanadium in the catalyst. The higher this ratio, the lower tends to be the Mooney viscosity of the product.

The minimum amount of catalyst which is required to effect polymerization is determined by the polymerization conditions. For example, it depends upon the temperature at which the copolymerization is carried out, on the particular monomers which are polymerized, and on the amount and type of impurities present. This minimum amount required is generally between one and five millimoles of catalyst per mole of total monomers in the feed, depending upon the features outlined above. The amount of catalyst in the feed in the present invention should be carefully controlled so as to produce a product of the required specifications.

As has been previously described, the preferred catalyst components for use in the process of the invention are vanadium oxytrichloride and an aluminum ethyl chloride, either aluminum ethyl dichloride, aluminum diethyl chloride or aluminum ethyl sesquichloride, $Al_2(C_2H_5)_3Cl_3$. Other vanadium compounds can be used also. The molar ratio of the catalyst components, expressed as Al/V molar ratio, has a number of effects on the process. At molar ratios less than 3 to 1, there is a tendency for crystalline products to be producd. The ratio also has an effect on the degree of conversion, and maximum yield has been found to be obtained at a ratio of about nine to one. It has also been found that as this ratio is increased, the Mooney viscosity of the products formed decreases. Considering all these factors, it has been concluded that the best value of Al/V for most purposes is about nine to one, and the best range being from about six to one to about twelve to one.

It will be appreciated from the foregoing description that many of the characteristics of the products produced by the process of the invention are dependent upon more than one process variable. Thus, the Mooney viscosity of the product is dependent upon the amount of catalyst used, the ratio of the catalyst components, and the reaction temperature. The ethylene content of the product is dependent upon both the composition of the feed and the degree of conversion. Consequently, to produce a product of desired characteristics it is necessary to start up the process under conditions which would be expected to give approximately the desired product, and then adjust the appropriate variables in accordance with the analysis of the product so produced. In other words, a system of feed back control must be used. With so many variables involved, one cannot predict with certainty the exact conditions required to give a product of a desired specification. However from the information given herein one skilled in the art will readily appreciate how to vary the conditions and obtain the desired product.

It will be appreciated from the foregoing general description of the process that it is versatile, in that amorphous, rubbery products can be produced having a pre-determined composition and Mooney viscosity, by varying the composition of the feed stream and other process conditions. The products so produced are amorphous, by which it is meant that at room temperature they are free of crystallinity as determined by X-ray measurements. The homogeneity of the products is demonstrated by the fact that products containing 76 mole percent of ethylene are produced without the appearance of crystallinity detectable by X-rays. A product with such a high ethylene content must clearly be compositionally homogeneous if crystallinity is not detectable, since as previously described the presence of large numbers of contiguous units derived from one monomer leads to crystallinity in the product. Further, the vulcanizates of the products show very good physical properties, indicating uniform distribution of the diene units.

The invention will be further described wtih reference to specific examples, relating to the production of sulphur vulcanizable terpolymers of ethylene, propylene and dicyclopentadiene.

In these examples, reactors of the general design previously outlined were used, of varying sizes, dependent upon the residence time to be used. In each case, vanadium oxytrichloride was used as one catalyst component. The other catalyst component varied from example to example, as indicated. The amount of catalyst is reported in terms of pounds of polymer produced per pound of vanadium oxytrichloride.

The unsaturation content of the products was measured by the drastic iodine-mercuric acetate method. This method, which is well known in the art, involves recovering the polymer, dissolving a measured quantity of polymer in carbon tetrachloride, and reacting the solution with excess iodine in the presence of chlor-acetic acid and mercuric acetate. The amount of iodine remaining after reaction is determined by titration with standard sodium thiosulphate solution, and from this the unsaturation of the polymer can readily be calculated.

The ethylene content of the polymer is determined from its infra-red spectrum. The optical density of the absorption band at frequency 1375 cm.$^{-1}$ is measured, which is a measure of the number of methyl groups present. This gives a measure of the content of propylene, from which the methyl groups are derived. From this and from the unsaturation measurement, the ethylene content is measured and reported.

EXAMPLES I TO III

In these examples, three terpolymers of ethylene, propylene and dicyclopentadiene were prepared in a reactor of the type previously described of volume one litre and at a residence time of 25 seconds. In each case the catalyst was a mixture of vanadium oxytrichloride, $VOCl_3$, and aluminum ethyl sesquichloride, $Al_2(C_2H_5)_3Cl_3$, and the solvent was hexane. All the reactants and the solvent were carefully dried before use.

The reactants were fed to the reactor in two feed streams. Stream A, the mixed feed, comprised ethylene, propylene, dicyclopentadiene and vanadium oxytrichloride, dissolved in a suitable amount of solvent-hexane. The ingredients of the mixed feed were initially held in storage tanks, and measured quantities of these ingredients were continuously fed to a mixing tank by means of pumps and metering flow valves. Stream A was cooled by contact with cooling coils containing liquid ethylene, in the course of feeding this stream to the reactor to provide the necessary pre-cooling of the feed. The volume of Stream A fed to the reactor in a given time was approximately 100 times the volume of Stream B fed in the same time.

Stream B comprised aluminum ethyl sesquichloride dissolved in more hexane. This stream was continuously fed in a measured quantity to the reactor, no pre-cooling of this feed stream being undertaken. The various feed streams, and the ingredients of the feed streams, were metered by means of flow valves, allowing the rate of flow of any feed stream or ingredient to be varied rapidly. In the examples when steady state conditions were achieved, the liquid in the reactor had a viscosity of less than one poise and a specific gravity of 0.66.

The reactor had an internal depth of five inches, and an internal diameter of four inches. It was equipped with an agitator comprising a central vertically disposed shaft having three vertically spaced sets of turbine blades mounted thereon. Each set consisted of six blades, equiangularly disposed, and each blade being of rectangular form, of area 0.375 inch$^2$. The extremity of each blade was disposed one inch radially outwardly of the shaft. The inlets to the reactor were both disposed in the cover plate, and the outlet for the product stream was provided at the center of the bottom of the spherical wall. The side wall of the reactor was provided with two closeable apertures for the reception of thermometers, for measuring the reaction temperature inside the vessel. The agitator was rotated at a constant speed of 3,500 r.p.m., thereby giving a terminal mixing time to the reactants in the reactor of 0.51 second.

The details of the process conditions and raw polymers produced in each example when operating under steady state conditions and producing a polymer of the desired specification are given in Table I.

TABLE I

| | Example | | |
|---|---|---|---|
| | I | II | III |
| Process conditions: | | | |
| Residence time (seconds) | 25 | 25 | 25 |
| Inlet temperature of stream A (° C.) | −15.5 | −16.7 | −14.4 |
| Reaction temperature (° C.) | 38.3 | 39.9 | 48.3 |
| Propylene:ethylene molar ratio | 1.165 | 0.95 | 0.77 |
| Aluminum:vanadium molar ratio | 9 | 9 | 9 |
| Wt. ratio of polymer:$VOCl_3$ | 300 | 325 | 350 |
| Monomer concentration in feed, weight percent | 5.5 | 5.1 | 5.6 |
| Total conversion, weight percent | 58 | 59 | 65 |
| Product analysis: | | | |
| Raw polymer Mooney, ML-4 at 100° C | 67 | 106 | 110 |
| Ethylene content, mole percent | 73 | 76 | 76 |
| Unsaturation (mole percent DCP) | 0.9 | 1.1 | 1.1 |
| X-ray crystallinity, percent | 0 | 0 | 0 |
| Room temperature solubility in toluene, percent | 100 | 100 | 99.5 |

It will be noted from the above results that in Examples II and III the polymers produced had an ethylene content of 76 mole percent, and yet show no detectable crystallinity. Further, the products had virtually no portion insoluble in toluene at room temperature, indicating the substantial absence of gelled product in the polymer. The runs were carried out for extended periods of time, and at the end there was no evidence of deposition of insoluble gelled polymer inside the reactor. These results are indicative of the highly homogeneous nature of the products.

Portions of the products were compounded and vulcanized in a standard vulcanization recipe, with oil, carbon black, accelerators, activators and sulphur. The stress-strain properties of the resulting vulcanizates were tested. The recipe was as follows:

| | Parts by weight |
|---|---|
| Polymer | 100 |
| Naphthenic oil | 20 |
| Carbon black, HAF grade | 60 |
| Zinc oxide (activator) | 5 |
| Stearic acid | 1 |
| Mercapto-benzo-thiazole (primary accelerator) | 0.5 |
| Tetramethyl thiuram disulphide (secondary accelerator) | 1.5 |
| Sulphur | 1.5 |

The results of the vulcanzation tests are given in Table II.

TABLE II

| Example | I | II | III |
|---|---|---|---|
| Polymer: | | | |
| Time of cure (minutes) | 40 | 20 | 20 |
| Tensile strength (p.s.i.) | 3,285 | 4,115 | 3,930 |
| Elongation at break (percent) | 550 | 555 | 515 |
| 300% modulus (p.s.i.) | 1,350 | 1,460 | 1,590 |

It will be recognized that the figures given in Table II for the stress-strain properties of the vulcanizates are extremely good for this type of polymer.

EXAMPLE IV

In this example, a terpolymer of ethylene, propylene and dicyclopentadiene was prepared in the same reactor as in Examples I to III, but at a residence time of one minute. The aluminum alkyl compound used in this example was aluminum ethyl dichloride. The procedure was as generally described in Examples I to III, the process conditions and product produced under steady state conditions being given in Table III.

TABLE III

Process conditions

| | |
|---|---|
| Residence time (minutes) | 1 |
| Inlet temperature of Stream A (° C.) | 62.2 |
| Reaction temperature (° C.) | 35.0 |
| Propylene:ethylene molar ratio | 2.17 |
| Aluminum:vanadium molar ratio | 12.0 |
| Weight ratio of polymers:VOCl$_3$ | 300 |
| Monomer concentration in feed, wt. percent | 9.2 |
| Total conversion, wt. percent | 59 |

Product Analysis

| | |
|---|---|
| Raw polymer Mooney ML-4 at 100° C. | 39 |
| Ethylene content, mole percent | 73 |
| Unsaturation (mole percent DCP) | 1.3 |
| X-ray crystallinity, percent | 0 |
| Room temperature, solubility in toluene, percent | 100 |

The polymer so produced was compounded and vulcanized in the recipe described previously, and the vulcanizate gave the stress-strain figures detailed in Table IV.

TABLE IV

| | |
|---|---|
| Time of cure (minutes) | 40 |
| Tensile strength (p.s.i.) | 2870 |
| Elongation at break (percent) | 440 |
| 300% modulus (p.s.i.) | 1815 |

These figures are extremely high for polymer of this type with a low Mooney viscosity.

EXAMPLES V AND VI

In these examples, a reactor of the type previously described having a volume of 3.5 litres was used to prepare terpolymers of ethylene, propylene and dicyclopentadiene, and the residence time was increased to four minutes. The terminal mixing time was calculated to be 1.1 seconds. The catalyst used was a mixture of vanadium oxytrichloride and aluminum ethyl sesquichloride. The process conditions in the two polymers differed considerably from each other, as shown in Table V.

TABLE V

| Example | V | VI |
|---|---|---|
| Process conditions: | | |
| Residence time (minutes) | 4 | 4 |
| Inlet temperature of feed stream A (° C.) | −4.4 | −70.5 |
| Reaction temperature (° C.) | 34.4 | 37.6 |
| Propylene:ethylene molar ratio | 1.84 | 0.60 |
| Aluminum:vanadium molar ratio | 9 | 9 |
| Weight ratio of polymer:VOCl$_3$ | 500 | 140 |
| Monomer concentration in feed, weight percent | 14.3 | 5.7 |
| Total conversion, weight percent | 30 | 79 |
| Product analysis: | | |
| Raw polymer Mooney ML-4 at 100° C | 98 | 68 |
| Ethylene content, mole percent | 74 | 68 |
| Unsaturation (mole percent DCP) | 1.1 | 1.3 |
| X-ray crystallinity, percent | 0 | 0 |
| Room temperature solubility in toluene, percent | 100 | 100 |

It should be noted that these examples indicate that lower feed inlet temperatures are necessary when the level of conversion is increased, to maintain similar reaction temperatures.

Tests on the vulcanizate prepared in the recipe were carried out as before, and the results are given in Table VI.

TABLE VI

| Example | V | VI |
|---|---|---|
| Time of cure (minutes) | 20 | 40 |
| Tensile strength (p.s.i.) | 3,840 | 2,270 |
| Elongation at break (percent) | 505 | 335 |
| 300% modulus (p.s.i.) | 1,625 | 1,980 |

EXAMPLES VII TO IX

In these examples, terpolymers of ethylene, propylene and dicyclopentadiene were prepared using a reactor of the type previously described but of volume 5.56 litres, and a residence time of 5.6 minutes. Some examples used aluminum ethyl dichloride and others used aluminum diethyl chloride as the alkyl catalyst ingredient, as indicated in the process conditions used during steady state polymerization given in Table VII. The terminal mixing time in each case was two seconds. The procedure was the same as generally outlined in connection with Examples I to III.

TABLE VII

| Example | VII | VIII | IX |
|---|---|---|---|
| Process conditions: | | | |
| Alkyl catalyst | EtAlCl$_2$ | Et$_2$AlCl | Et$_3$Al$_2$Cl$_3$ |
| Residence time (minutes) | 5.6 | 5.6 | 5.6 |
| Inlet temperature of feed stream A (° C.) | −13.9 | −13.9 | −12.2 |
| Reaction temperature (° C.) | 55.5 | 56.0 | 46.6 |
| Propylene:ethylene molar ratio | 0.755 | 2.88 | 3.2 |
| Aluminum:vanadium molar ratio | 8.9 | 9.1 | 9.0 |
| Weight ratio of catalyst:VOCl$_3$ | 190 | 500 | 640 |
| Monomer concentrate in feed, weight percent | 6.7 | 23.4 | 29.0 |
| Total conversion, weight percent | 82 | 20 | 17 |
| Product analysis: | | | |
| Raw polymer Mooney ML-4 at 100° C. | 54 | 41 | 86 |
| Ethylene content, mole percent | 71 | 69 | 71 |
| Unsaturation (mole percent DCP) | 1.0 | 1.0 | 0.8 |
| X-ray crystallinity, percent | 0.5 | 0 | <0.5 |
| Room temperature solubility in toluene, percent | 99.9 | 100 | 98.6 |

Portions of each polymer were vulcanized in the recipe previously described, and the results of the stress-strain tests on the vulcanizate are recorded in Table VIII.

TABLE VIII

| Example | VII | VIII | IX |
|---|---|---|---|
| Time of cure (minutes) | 40 | 80 | 40 |
| Tensile strength (p.s.i.) | 1,965 | 3,060 | 3,580 |
| Elongation at break (percent) | 385 | 560 | 635 |
| 300% modulus (p.s.i.) | 1,440 | 1,310 | 1,140 |

In addition to their very good stress-strain vulcanizate properties, the products of the process of this invention exhibited high rates of cure, high rates of extrusion, low compression set, and good resistance to heat ageing, as compared with ethylene-propylene-dicyclopentadiene terpolymers produced by other processes.

What is claimed is:

1. A continuous process for producing a substantially amorphous copolymer of ethylene and at least one other monomer copolymerizable therewith by continuous polymerization of the monomers in the presence of a catalyst comprising a soluble vanadium compound and an alkyl aluminum compound selected fom the group comprising aluminum alkyl dichlorides, aluminum dialkyl monochlorides, and aluminum alkyl sesquichlorides, which comprises continuously feeding the reaction components in one or more liquid feed streams to a reaction zone in which the copolymerization takes place, continuously withdrawing from said reaction zone, at a rate equal to that at which the reaction components are fed to the reaction zone, a liquid product stream and continuously deactivating the catalyst in said product stream issuing from the reaction zone, wherein the residence time of the reaction components in the reaction zone is from about 6 seconds to 6 minutes, the reaction is carried out semi-adiabatically at a substantially constant predetermined temperature below about 100° C. by precooling of at least one feed stream prior to entering the reaction zone, to a sufficient extent to compensate for the heat generated by the copolymerization reaction, so as to avoid contacting the reaction solution while in the reaction zone with cooled heat transfer surfaces, and the terminal mixing time of the reaction components within the reaction zone is not more than one-quarter of said residence time.

2. A process as claimed in claim 1 wherein the molar ratio of aluminum to vanadium in the catalyst is from 6:1 to 12:1.

3. A process as claimed in claim 1 wherein the reaction components are continuously fed to the reaction zone in two liquid feed streams, one feed stream being a mixed feed stream and comprising solvent, the vanadium-containing catalyst component and dissolved monomers, and the other feed stream comprising an organo-aluminum catalyst compound and more solvent, the mixed feed stream being pre-cooled before entering the reaction zone, and the other feed stream being fed to the reaction zone at ambient temperature.

4. A process as claimed in claim 3 wherein the mixed feed stream is pre-cooled to an extent of from 35 to 110° C. below the reaction temperature.

5. A process as claimed in claim 1 wherein the residence time is from 25 seconds to 4 minutes.

6. A process as claimed in claim 1 wherein the terminal mixing time is less than one-tenth of the residence time.

References Cited

UNITED STATES PATENTS

| | | | |
|---|---|---|---|
| 3,341,503 | 9/1967 | Paige | 260—80.78 |
| 3,380,978 | 4/1968 | Ryan | 260—88.2 |

JOSEPH L. SCHOFER, Primary Examiner

R. S. BENJAMIN, Assistant Examiner

U.S. Cl. X.R.

260—88.2